United States Patent
Gilbert et al.

(10) Patent No.: US 10,325,318 B2
(45) Date of Patent: Jun. 18, 2019

(54) SYSTEMS AND METHODS FOR FINANCIAL INSTRUMENT INSPECTION

(75) Inventors: Andrew C. Gilbert, Califon, NJ (US); Mary Ann Gilbert, legal representative, Califon, NJ (US); William P. Tselepis, New Providence, NJ (US); Mary K. Tselepis, legal representative, New Providence, NJ (US); Andrew Stergiopoulos, New York, NY (US); Angela Stergiopoulos, legal representative, Great Neck, NY (US)

(73) Assignee: BGC PARTNERS INC., New York, NY (US)

( * ) Notice: Subject to any disclaimer, the term of this patent is extended or adjusted under 35 U.S.C. 154(b) by 714 days.

(21) Appl. No.: 13/609,978

(22) Filed: Sep. 11, 2012

(65) Prior Publication Data
US 2013/0159213 A1 Jun. 20, 2013

Related U.S. Application Data

(60) Continuation of application No. 11/567,369, filed on Dec. 6, 2006, now Pat. No. 8,290,837, which is a division of application No. 10/144,695, filed on May 10, 2002, now abandoned.

(60) Provisional application No. 60/290,713, filed on May 14, 2001.

(51) Int. Cl.
*G06Q 40/06* (2012.01)
*G06Q 40/00* (2012.01)
*G06Q 40/04* (2012.01)

(52) U.S. Cl.
CPC ............ *G06Q 40/06* (2013.01); *G06Q 40/00* (2013.01); *G06Q 40/04* (2013.01)

(58) Field of Classification Search
CPC ......... G06Q 40/04; G06Q 40/00; G06Q 40/06
USPC ...................................... 705/35–37
See application file for complete search history.

(56) References Cited

U.S. PATENT DOCUMENTS

| | | | |
|---|---|---|---|
| 3,656,148 A | 4/1972 | Belcher et al. |
| 3,976,840 A | 8/1976 | Cleveland et al. |
| 4,674,044 A | 6/1987 | Kalmus et al. |
| 5,003,473 A | 3/1991 | Richards |
| 5,038,284 A | 8/1991 | Kramer |
| 5,161,103 A | 11/1992 | Kosaka et al. |
| 5,220,500 A | 6/1993 | Baird et al. |
| 5,230,048 A | 7/1993 | Moy |
| 5,267,148 A | 11/1993 | Kosaka et al. |
| 5,270,922 A | 12/1993 | Higgins |
| 5,297,031 A | 3/1994 | Gutterman et al. |

(Continued)

OTHER PUBLICATIONS

U.S. Appl. No. 60/290,713, filed May 14, 2001, Gilbert et al.

(Continued)

*Primary Examiner* — Hao Fu

(57) ABSTRACT

Systems and methods for user-configurable financial instrument inspection are provided. A user may select the type of financial performance information and presentation format of the financial performance information to be displayed when the user selects a particular financial instrument. The user may associate a set of financial performance information and presentation format with a particular financial market for financial instruments. The financial instrument inspector may also facilitate trading of financial instruments.

18 Claims, 9 Drawing Sheets

(56) References Cited

U.S. PATENT DOCUMENTS

| | | | |
|---|---|---|---|
| 5,297,032 A | 3/1994 | Trojan et al. | |
| 5,371,844 A | 12/1994 | Andrew et al. | |
| 5,675,746 A | 10/1997 | Marshall | |
| 5,689,650 A | 11/1997 | McClelland et al. | |
| 5,778,357 A | 7/1998 | Kolton et al. | |
| 5,893,079 A | 4/1999 | Cwenar | |
| 5,946,666 A | 8/1999 | Nevo et al. | |
| 6,134,535 A | 10/2000 | Belzberg | |
| 2,134,118 A1 | 5/2001 | Foss | |
| 6,408,282 B1 * | 6/2002 | Buist | 705/36 R |
| 6,772,146 B2 * | 8/2004 | Khemlani et al. | 705/36 R |
| 6,801,741 B2 | 10/2004 | Bates et al. | |
| 6,915,486 B2 | 7/2005 | Li et al. | |
| 7,036,089 B2 | 4/2006 | Bauer | |
| 7,212,999 B2 | 5/2007 | Friesen et al. | |
| 8,290,837 B2 | 10/2012 | Gilbert et al. | |
| 2002/0174043 A1 | 11/2002 | Gilbert et al. | |

OTHER PUBLICATIONS

Notification of Transmittal of the International Search Report or the Declaration for Application No. PCT/US2002/017672 dated Apr. 11, 2003 (5 pages).
International Preliminary Examination Report for Application No. PCT/US2002/017672 dated Feb. 2, 2004 (6 pages).
UK Examination Report for Application No. GB 0328622.6 dated Aug. 12, 2004 (6 pages).
USPTO Office Action for U.S. Appl. No. 10/144,695, dated Jul. 31, 2003 (10 pages).
USPTO Office Action for U.S. Appl. No. 10/144,695, dated Jan. 16, 2004 (11 pages).
USPTO Office Action for U.S. Appl. No. 10/144,695, dated Oct. 12, 2004 (3 pages).
USPTO Office Action for U.S. Appl. No. 10/144,695, dated Jan. 6, 2005 (9 pages).
USPTO Office Action for U.S. Appl. No. 10/144,695, dated Sep. 12, 2005 (10 pages).
USPTO Office Action for U.S. Appl. No. 10/144,695, dated Dec. 15, 2005 (3 pages).
USPTO Office Action for U.S. Appl. No. 10/144,695, dated Jun. 5, 2006 (5 pages).
USPTO Examiner Interview Summary Record for U.S. Appl. No. 10/144,695, dated Jul. 24, 2006 (3 pages).
USPTO Office Action for U.S. Appl. No. 11/567,369, dated Feb. 26, 2009 (13 pages).
USPTO Examiner Interview Summary Record for U.S. Appl. No. 11/567,369, dated Jul. 23, 2009 (2 pages).
EPO Communication with Declaration for Application No. 02253355.8, dated Mar. 10, 2003 (3 pages).
USPTO Notice of Allowance and Fees Due and Examiner Interview Summary Record for U.S. Appl. No. 11/567,369, dated Nov. 17, 2009 (24 pages).
Brad A. Meyers, "Windows Interfaces—A Taxonomy of Window Manager User Interfaces," IEEE Computer Graphics and Applications (Sep. 1998), vol. 8, No. 5, pp. 65-84.
USPTO Notice of Allowability for U.S. Appl. No. 11/567,369, dated Sep. 21, 2012 (3 pages).
USPTO Notice of Allowance and Fees Due for U.S. Appl. No. 11/567,369, dated Jun. 18, 2012 (21 pages).

* cited by examiner

| TRADESPARK * FXOPT47@SM_ESPEEDBETA10 | | | _ 🗗 X |
|---|---|---|---|
| FILE ACTIONS VIEW OPTIONS CUSTOMER GRIDS HELP | | | |
| SYMBOL | FXOPT50 | MARKET | DETACHED TRADING VIEW — FXOPT47 |

| | | | | |
|---|---|---|---|---|
| | | | | MARKET |
| + EUR/JPY_1W_ATM | 18.10 | X60 | EUR/JPY_1W_ATM | |
| + EUR/JPY_2W_ATM | | | – 18.10 X60 | |
| + EUR/JPY_1M_ATM | | | | |
| + EUR/JPY_2M_ATM | | | 30L – 18.20 X30 |
| + EUR/USD_1W_ATM | | | 30L – 18.25 X30 |
| + EUR/USD_2W_ATM | | | – 18.30 X30 |
| + EUR/USD_1M_ATM | | | – 18.35 X30 |
| + EUR/USD_2M_ATM | | | |
| + EUR/USD_3M_ATM | | | SPOT- 111.51 |
| + USD/JPY_1W_ATM | | | FWD7 D +18 PLMP |
| + USD/JPY_2W_ATM | | | US DEPO- 5.03 |
| + USD/JPY_1M_ATM | | | CUT-OFF- NY |
| + USD/JPY_2M_ATM | | | DELTA- 27 |
| + USD/JPY_3M_ATM | | | SPRD RATIO- 2 1 |
| + AUD/USD_1W_ATM | | | |
| + AUD/USD_2W_ATM | | | |
| + AUD/USD_1M_ATM | | | COMMAND LINE: |
| + AUD/USD_2M_ATM | | | |
| + AUD/USD_3M_ATM | | | |

| ACTIVE ORDERS | TRADE HISTORY | MARKET HISTORY | STATUS |
|---|---|---|---|
| STATUS | TYPE | SIZE | INST NAME | PRICE/DATE | TIME | COMMENTS | TRADE REF# | COMMENTS |

FIG. 5

| TRADESPARK * FXOPT47@SM_ESPEEDBETA10 | | | | _ 🗗 X |
|---|---|---|---|---|
| FILE ACTIONS VIEW OPTIONS CUSTOMER GRIDS HELP | | | | |
| | SYMBOL | FXOPT50 | MARKET | LAST PRICE |
| | | 18.10 | X60 | 18.10 |
| + | EUR/JPY_1W_ATM | | | 1.30 |
| + | EUR/JPY_2W_ATM | | | 16.25 |
| + | EUR/USD_1M_ATM | | | 16.65 |
| + | EUR/JPY_2M_ATM | | | 13.50 |
| + | EUR/USD_1W_ATM | | | 13.65 |
| + | EUR/USD_2W_ATM | | | 15.20 |
| + | EUR/USD_1M_ATM | | | 14.10 |
| + | EUR/USD_2M_ATM | | | 12.80 |
| + | EUR/USD_3M_ATM | | | 7.00 |
| + | EUR/JPY_1W_ATM | | | 10.50 |
| + | EUR/JPY_2W_ATM | | | 11.00 |
| + | EUR/JPY_1M_ATM | | | 10.70 |
| + | EUR/JPY_2M_ATM | | | 11.30 |
| + | EUR/JPY_3M_ATM | | | 2.00 |
| + | EUR/USD_1W_ATM | | | 100.00 |
| + | EUR/USD_2W_ATM | | | |

302

| DETACHED TRADING VIEW | | | _ 🗗 X |
|---|---|---|---|
| SYMBOL 334 | FXOPT47 | | |
| | MARKET | | |
| | — 18.10 | X60 | |
| EUR/JPY_1W_ATM | 30L | 18.20 | X30 |
| | 30L | 18.25 | X30 |
| | | 18.30 | X30 |
| | | 18.35 | X30 |

| ACTIVE ORDERS | TRADE HISTORY | MARKET HISTORY | STATUS |
|---|---|---|---|
| STATUS | TYPE | SIZE | INST NAME | PRICE/RATE |

FIG. 6

SYSTEMS AND METHODS FOR FINANCIAL INSTRUMENT INSPECTION

CROSS REFERENCE TO RELATED APPLICATIONS

This application is a continuation of Ser. No. 11/567,369 filed Dec. 6, 2006, now U.S. Pat. No. 8,290,837 which is a divisional of U.S. patent application Ser. No. 10/144,695 (U.S. Patent Application Publication No. US 2002/0174043), filed May 10, 2002, which claims the benefit of U.S. Provisional Patent Application No. 60/290,713, filed May 14, 2001, all of which are hereby incorporated by reference herein in there entireties.

BACKGROUND OF THE INVENTION

The present invention relates to systems and methods for financial instrument inspection. More particularly, the present invention relates to systems and methods for user-configurable financial instrument inspection that may allow a user to view specific information related to a financial instrument in a desired format.

Presently, in order to research financial instruments, investors may need to seek several sources of information to retrieve financial performance information relating to a particular investment instrument. An investor may have a personal preference for the types of financial performance information that he or she would like to view before making an investment decision. In many instances, the content of the information resource and its presentation format is not configurable by a user. An investor may spend a significant amount of time searching various sources of financial information in order to collect investment performance information that an investor deems to be most important in making an investment decision. Market conditions for a particular investment instrument may be changing while an investor conducts research.

It would therefore be desirable to provide systems and methods for a user-configurable financial instrument inspector that may allow a user to view specific information related to a financial instrument in a desired format.

SUMMARY OF THE INVENTION

In accordance with the present invention, systems and methods for a user-configurable financial instrument inspector are provided. A user may select the type and presentation format of financial performance data to be displayed when the user selects a particular investment instrument. The user may associate financial performance information and presentation formats with particular financial investment instruments. The financial instrument inspector may also facilitate trading of investment instruments.

In some embodiments, financial information for a selected investment instrument may appear on a separate display screen, a separate display window, a user-selected window, a combination thereof, or in any suitable area or device.

The user may also customize the financial performance information of a selected investment instrument to be displayed. For example, the user may configure the display format and spatial orientation of the selected financial performance information of an investment instrument. In some embodiments, the user may also configure which financial performance information is displayed and the spatial location of the information in the display for financial instruments of a particular market (e.g., stock market, bond market, futures market, options market, etc.). The user may select from relevant financial information to be displayed, including financial performance statistics, metrics, graphs, any combination thereof, or any other suitable information.

The financial instrument inspector may facilitate trading of financial instruments. The financial instrument inspector may list deliverable financial instruments related to trades. In some embodiments, the financial instrument inspector may provide links to third party vendors of financial instruments.

BRIEF DESCRIPTION OF THE DRAWINGS

Further features of the invention, its nature and various advantages will be more apparent from the following detailed description of the preferred embodiments, taken in conjunction with the accompanying drawings, in which like reference characters refer to like parts throughout, and in which:

FIG. 5 is an illustrative financial instrument inspector display where a separate window containing performance information for a selected financial instrument is displayed in accordance with various embodiments of the present invention;

FIG. 6 is an illustrative financial instrument inspector display where a separate window containing an alternative arrangement of performance information of a selected security is displayed in accordance with various embodiments of the present invention;

DETAILED DESCRIPTION OF THE INVENTION

The present invention is now described in more detail in conjunction with FIGS. 1-9.

Figure 1:
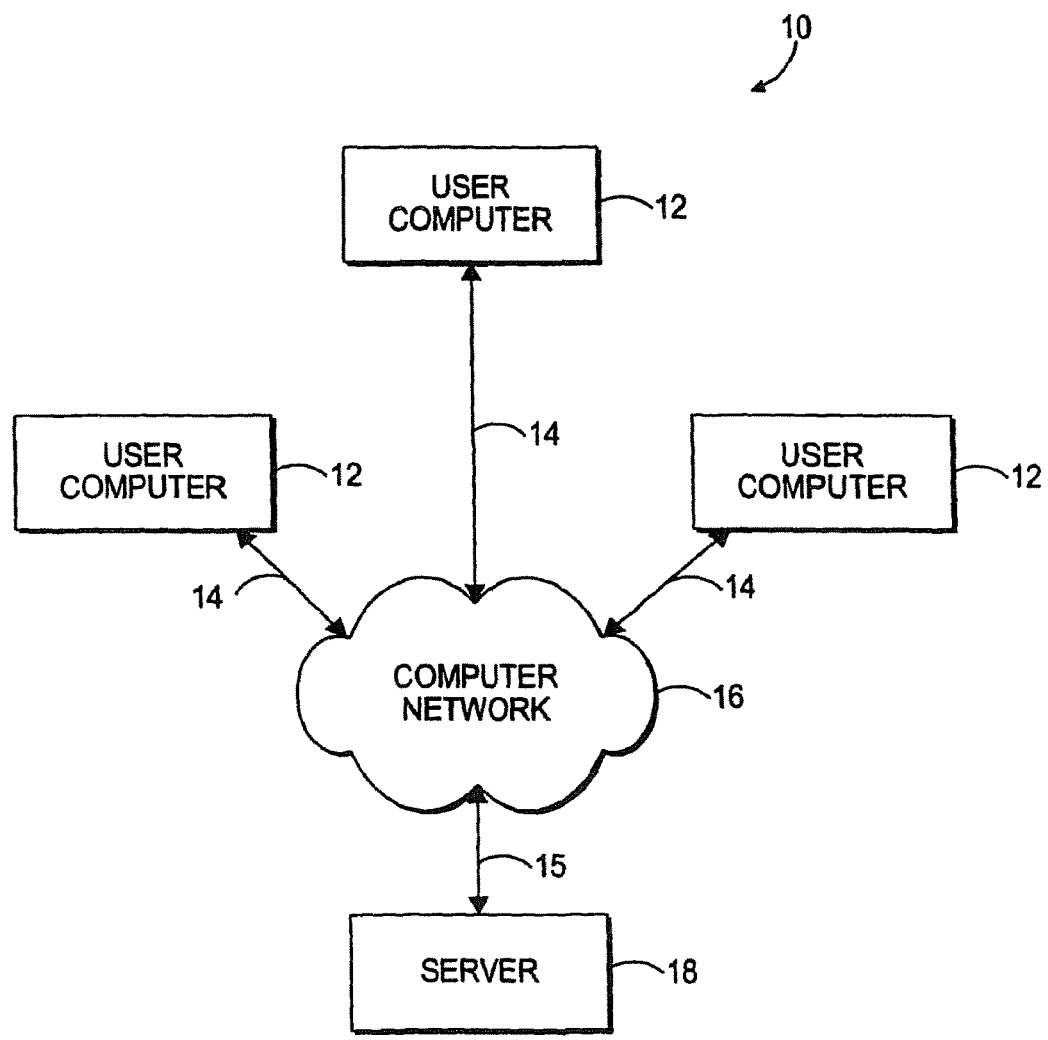
FIG. 1 is a schematic diagram of an illustrative financial instrument inspector system in accordance with various embodiments of the present invention.

FIG. 1 is a schematic diagram of an illustrative financial instrument inspector system 10 suitable for implementation of instrument inspection and trading in accordance with various embodiments of the present invention. Aspects of the invention apply to various types of financial instruments.

System 10 may be used to provide financial instrument inspection to users of various computer equipment. A financial instrument inspector application may be used to provide users with the ability to view various information related to financial instruments. In one suitable approach, the financial instrument inspector application may run locally on computer equipment. Computer equipment, such as user computer 12 may be a computer, processor, personal computer, laptop computer, handheld computer, personal digital assistant, computer terminal, any other suitable computing device, or a combination of such devices. In another suitable approach, the financial instrument inspector application may run using a client-server or distributed architecture where a portion of the financial instrument inspector application may be implemented locally on the computer equipment in the form of, for example, a client process. Another portion of the financial instrument inspector application may be implemented at a remote location, such as on a server or any other suitable equipment as, for example, a server process. A server such as server 18 may be any suitable server, processor, computer, data processing device, or a combination of such devices. In one example, server 18 may be a server powered by eSpeed, Inc.

Figure 2:
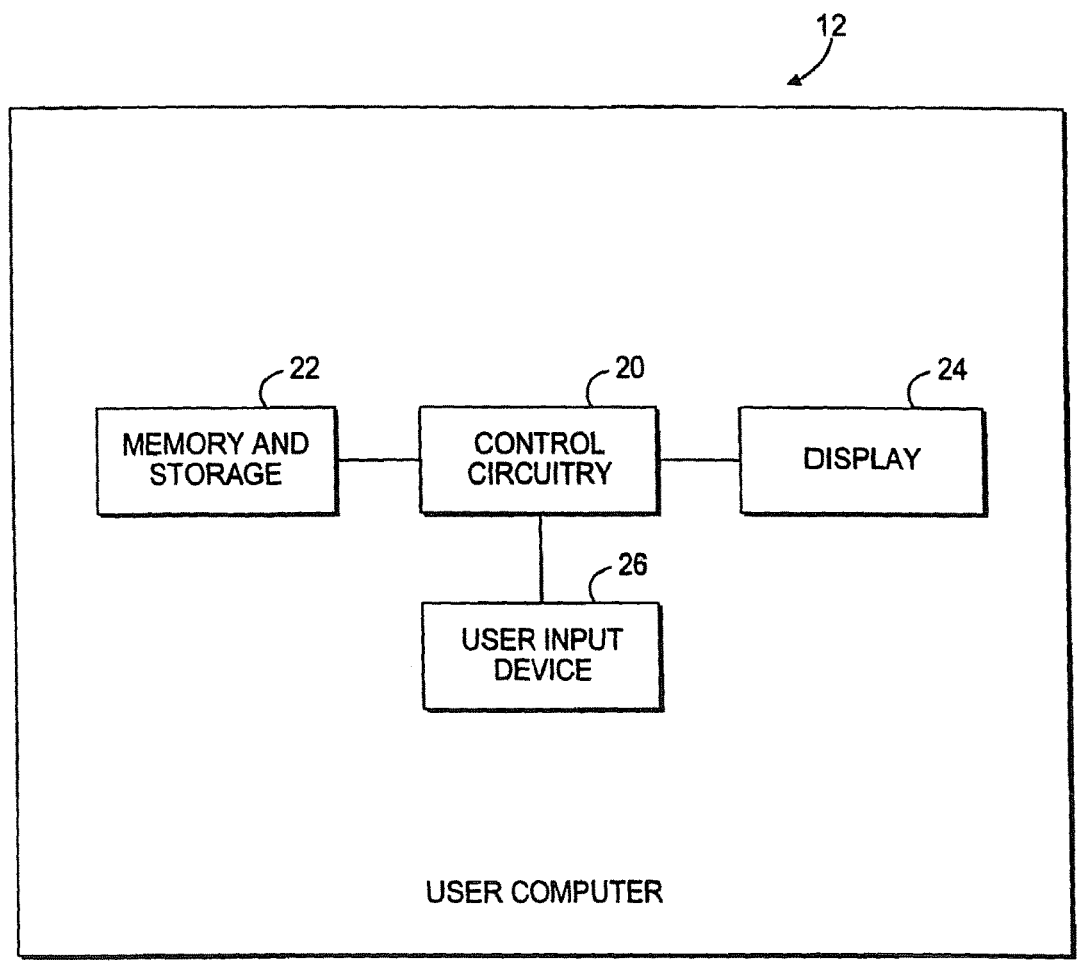
FIG. 2 is a schematic diagram of illustrative computer equipment in accordance with various embodiments of the present invention.

A generalized schematic diagram of user computer 12 is shown in FIG. 2. User computer 12 may include control circuitry 20, memory and storage 22, display 24, and user input device 26. Control circuitry 20 and memory and storage 22 may have communications, memory, and processing circuitry suitable for supporting functions such as accessing the financial instrument inspection application. Text and graphics associated with the financial instrument inspector application may be presented to a user using display 24. Display 24 may be a computer monitor, a handheld computer display, a laptop computer display, a personal digital assistant display, or any other suitable display equipment. In some embodiments, a plurality of displays may be connected to user computer 12.

The user may interact with control circuitry 20 using any suitable user input device 26, such as a keyboard, a wireless keyboard, a mouse, a trackball, a touch pad, or any other suitable input device.

Referring back to FIG. 1, computer network 16 may link user computers 12 and server 18. Server 18 may be connected to computer network 16 by one or more communications links 15. Computer network 16 may be any suitable computer network including the Internet, an Intranet, a local-area network (LAN), a wide-area network (WAN), a metropolitan area network (MAN), a virtual private network (VPN), a wireless network, an optical network, an asynchronous transfer mode network (ATM), a cable network, a frame relay network, a digital subscriber line network (DSL), or a combination of such networks.

The components of system 10 may be interconnected using various communications links, such as links 14 and 15. Communications links 14 and 15 may include satellite paths, coaxial cable paths, fiber-optic paths, twisted pair paths, other wire or cable-based links, modems, wireless paths through free space, any other suitable paths, or a combination of such paths. Communications over communications links such as links 14 and 15 may involve analog transmissions, digital transmissions, wireless transmissions, microwave transmissions, radio-frequency transmissions, optical transmissions, audio transmissions, any other suitable type of transmissions, or a combination of such transmissions. Communications may involve Internet transmissions, private network transmissions, packet-based transmissions, or any other suitable type of transmissions. Communications links 14 and 15 may include cable connected to cable modems, digital subscriber lines (DSL), integrated services digital network (ISDN) lines, or any other suitable paths.

Traders or users at user computers 12 may view information related to financial instruments by interacting with the financial instrument inspector application. The financial instrument inspector application may provide a user at user computer 12 with displays (e.g., display 100 illustrated in FIG. 4) containing various trading and market information. For example, the user may be presented with displays that allow the user to make trades, view relevant trade information, or any other suitable screen in connection with the inspection of financial instruments.

The financial instrument inspector application may provide the user with interactive displays containing menus and selectable options that allow the user to navigate through the financial instrument inspector application and select financial performance information and spatial placement of the financial performance information displayed related to a financial instrument. With user computer 12, the user may use a keyboard, mouse, trackball, touch pad, or other suitable input or pointing device to navigate the various menus and selectable options.

The user may access the financial instrument inspector application by browsing to an Internet web site or a site on a private network, by running a local program, or by any other suitable method.

Figure 3:
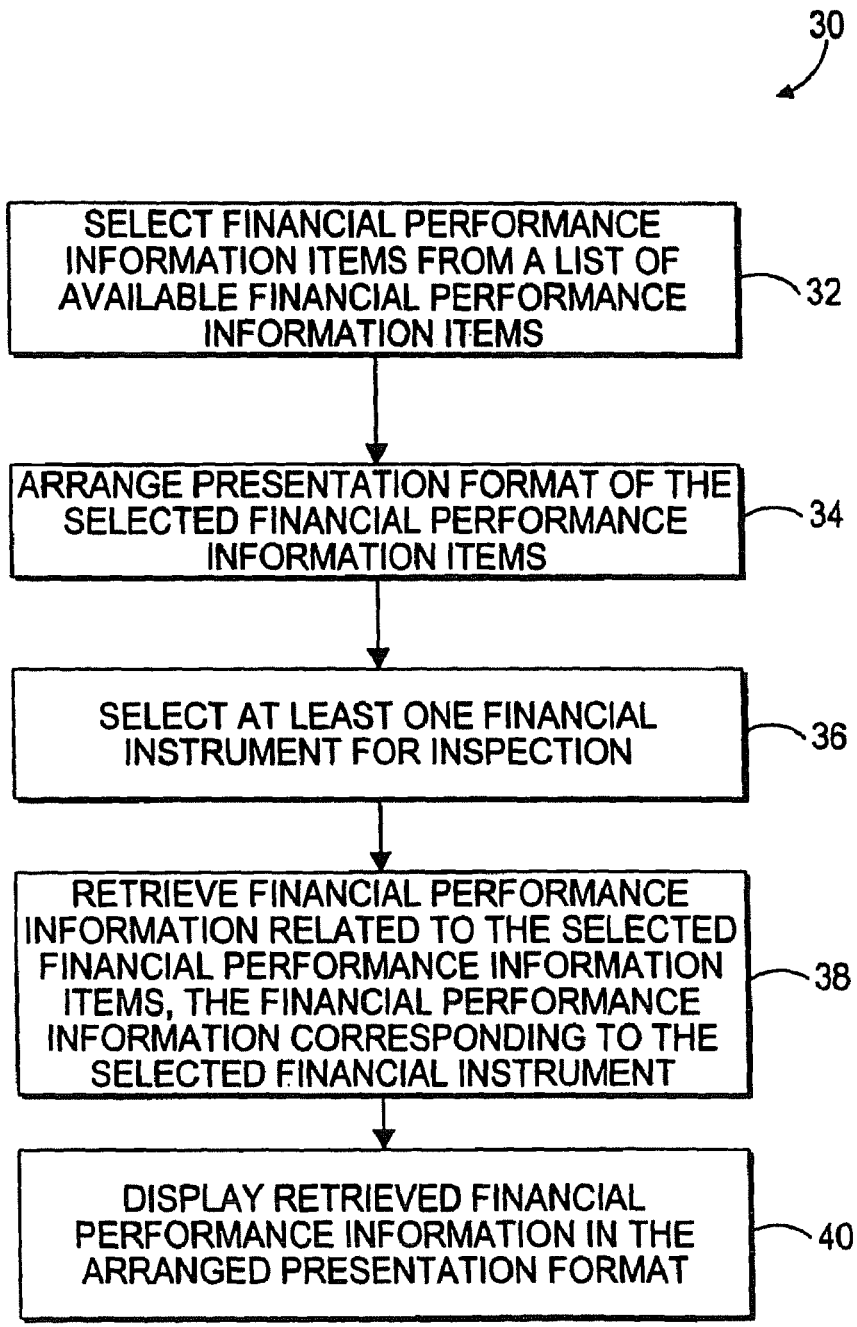
FIG. 3 is an illustrative flow diagram for a method for financial instrument inspection in accordance with various embodiments of the present invention.

FIG. 3 is an illustrative flow diagram for method 30 for financial instrument inspection.

As shown in FIG. 3, financial performance information items may be selected from a list of items related to financial performance information at step 32. Financial performance information items that may be listed may include depth of market, price levels, deposit rates, spot rates, cut-off, Federal wire information, total assets, long-term notes payable, shareholder equity, capital stock, retained earnings, current ratio, quick ratio, cash ratio, working capital, market capitalization, outstanding shares, debt/equity ratio, earnings, revenue, equity, dividend yield, return on equity (ROE), return on investment (ROI), return on capital investment (ROIC), current assets, cash and equivalents, short and long term investments, accounts receivable, inventories and prepaid expenses, current liabilities, accounts payable, accrued expenses, income tax payable, short term notes payable, long term debt payable, book value, enterprise value, price/sales ratio, price/earnings ratio, accounts receivable turnover, days sales outstanding (DSO), inventory turnover, previous close price, last trade price, day's price range, 52 week price range, volume traded, average volume traded, any combination thereof, or any other relevant financial instrument performance information.

For example, a user may select financial performance information items from a list of items. Financial performance information related to the selected items may be displayed in conjunction with a financial investment instrument (e.g., stocks, bonds, futures, options, etc.). Thus, a user may select financial performance items such as debt/equity ratio, earnings, revenue, and return on equity, wherein the financial performance information related to these selected items are displayed in connection with selected stocks. The user may also select financial performance items such as interest, yield, or term, wherein the financial performance information related to these selected items is displayed when the selected financial instrument is a bond.

Alternatively, a financial instrument inspection system (e.g., system 10 illustrated in FIG. 1) may select the financial performance information items related to a selected financial instrument (e.g., bond, stock, etc.). In yet another alternative embodiment, a financial instrument inspection system may select default financial performance information items (e.g., debt/equity ratio, earnings, revenue, return on equity, etc.), wherein the financial performance information related to these selected items may be displayed until a user selects specific financial performance information items.

The presentation format for the selected financial performance information items may be arranged at step 34. In some embodiments, a user may manipulate a user input device (e.g., user input device 26 illustrated in FIG. 2) to arrange the display of the financial performance information items. Alternatively, a financial instrument inspection system may arrange the presentation format for the financial performance information items.

At step 36, at least one financial instrument may be selected for inspection. For example, a user may select a financial instrument (e.g., bond, stock, option, etc.) using a user input device (e.g., user input device 26) in order to obtain financial performance information related to the selected financial instrument.

At step 38, the financial performance information related to the selected financial performance information items may be retrieved. The financial performance information may be retrieved from user computer 12, server 18, any computing device or server connected to computer network 16, any combination thereof, or any other suitable device. At step 40, the retrieved financial performance information may be displayed in the arranged presentation format.

Figure 4:
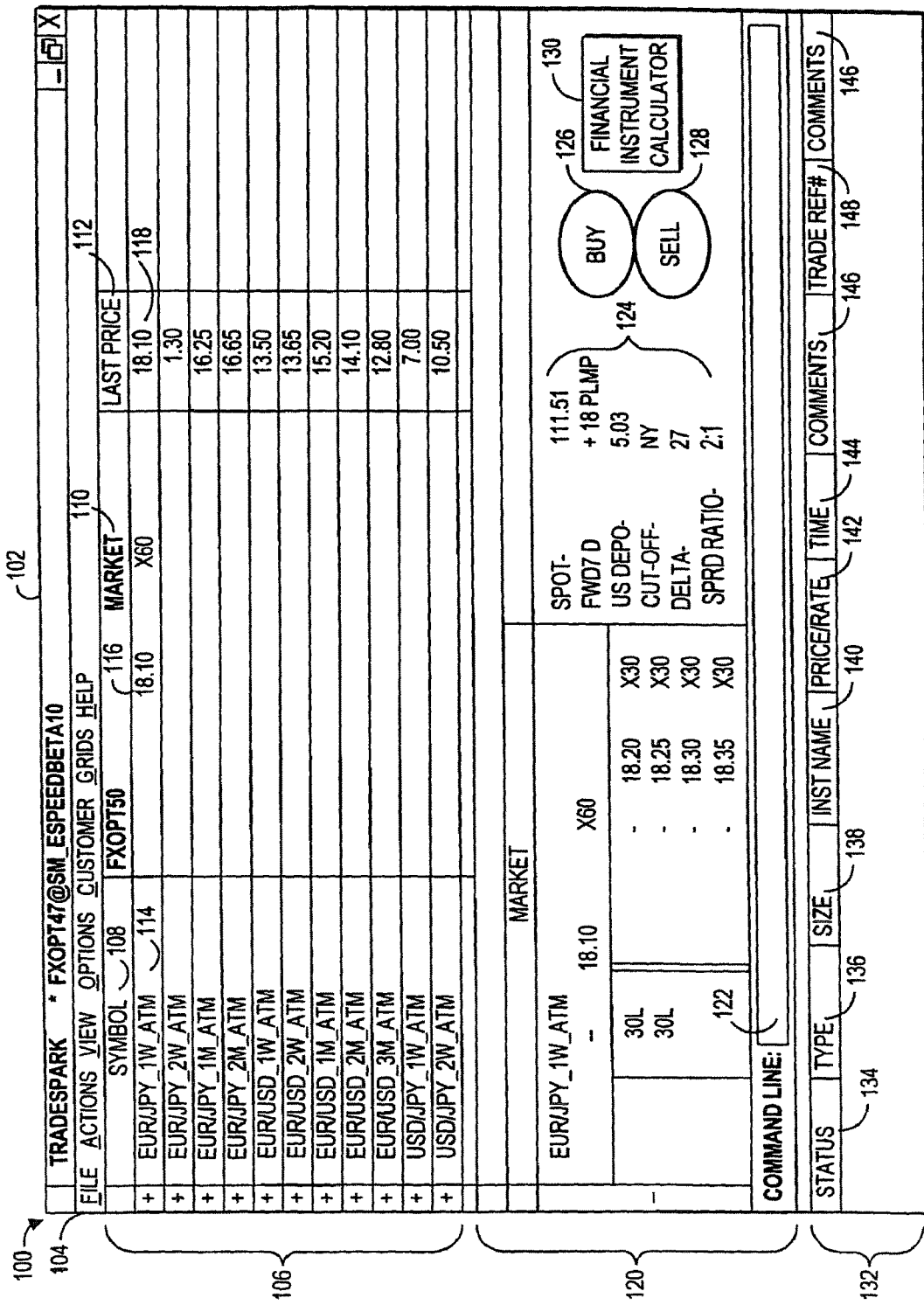
FIG. 4 is an illustrative financial instrument inspector display in accordance with various embodiments of the present invention.

FIG. 4 is an illustrative financial instrument inspector application display 100. Title bar 102 of display 100 may include the name of the financial instrument inspector application, the name of the user, a financial trading account number of the user, or any other suitable information.

Menu items bar 104 may include menu items such as file, actions, view, options, customer, grids, help, any combination thereof, or any other suitable item. When a menu item is selected by the user, a list of options may be provided to the user, each of which may be selectable by the user. For example, if the file menu item is selected, a user may select from options such as new, open, close, save, save as, exit, or any other suitable option. In some embodiments, when an option is selected, an additional list of options may be displayed that are related to the selected option. If there are no sublists associated with a selected option, the selected option may be executed (e.g., the request may be processed by system 10 of FIG. 1).

Financial instrument listings window 106 may be a list of financial instruments, pricing information related to the instruments, or any other suitable information. Financial instrument listings window 106 may contain various columns of information, including symbol column 108, market performance data column 110, last price column 112, or any other suitable column. Symbol column 108 in financial instrument listings window 106 may contain a list of symbols representing financial instruments (e.g., financial instrument 114). Financial instruments in this list may be selectable by the user. In some embodiments, the user may select a financial instrument by using user input device 26 of FIG. 2. The user may select a financial instrument in order to obtain financial instrument performance data (e.g., debt/equity ratio, earnings, revenue, etc.).

Figure 7:
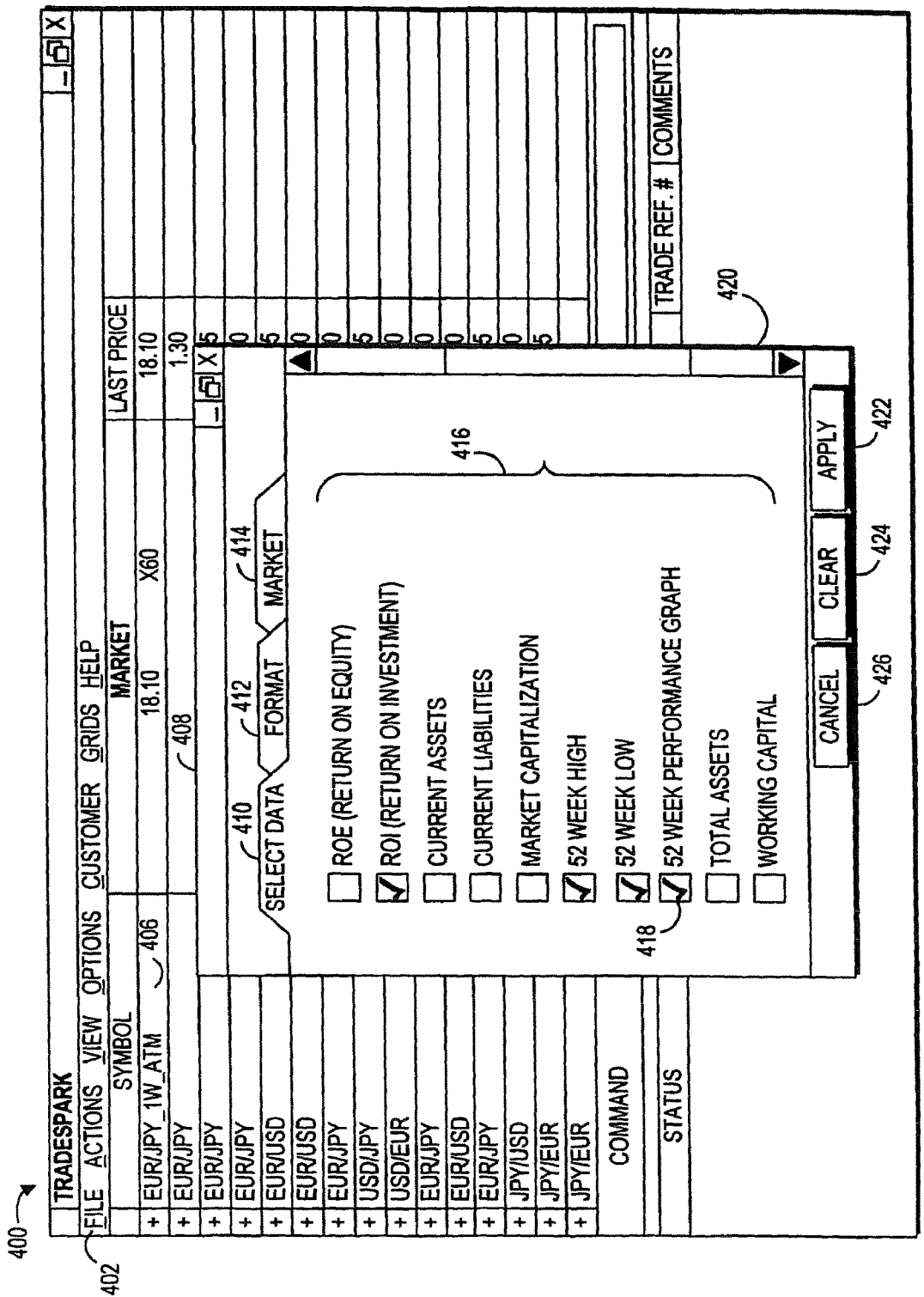
FIG. 7 is an illustrative financial instrument inspector display with a separate window where a user may configure which financial performance information may be displayed when the user selects an investment instrument for inspection in accordance with various embodiments of the present invention.
Figure 8:
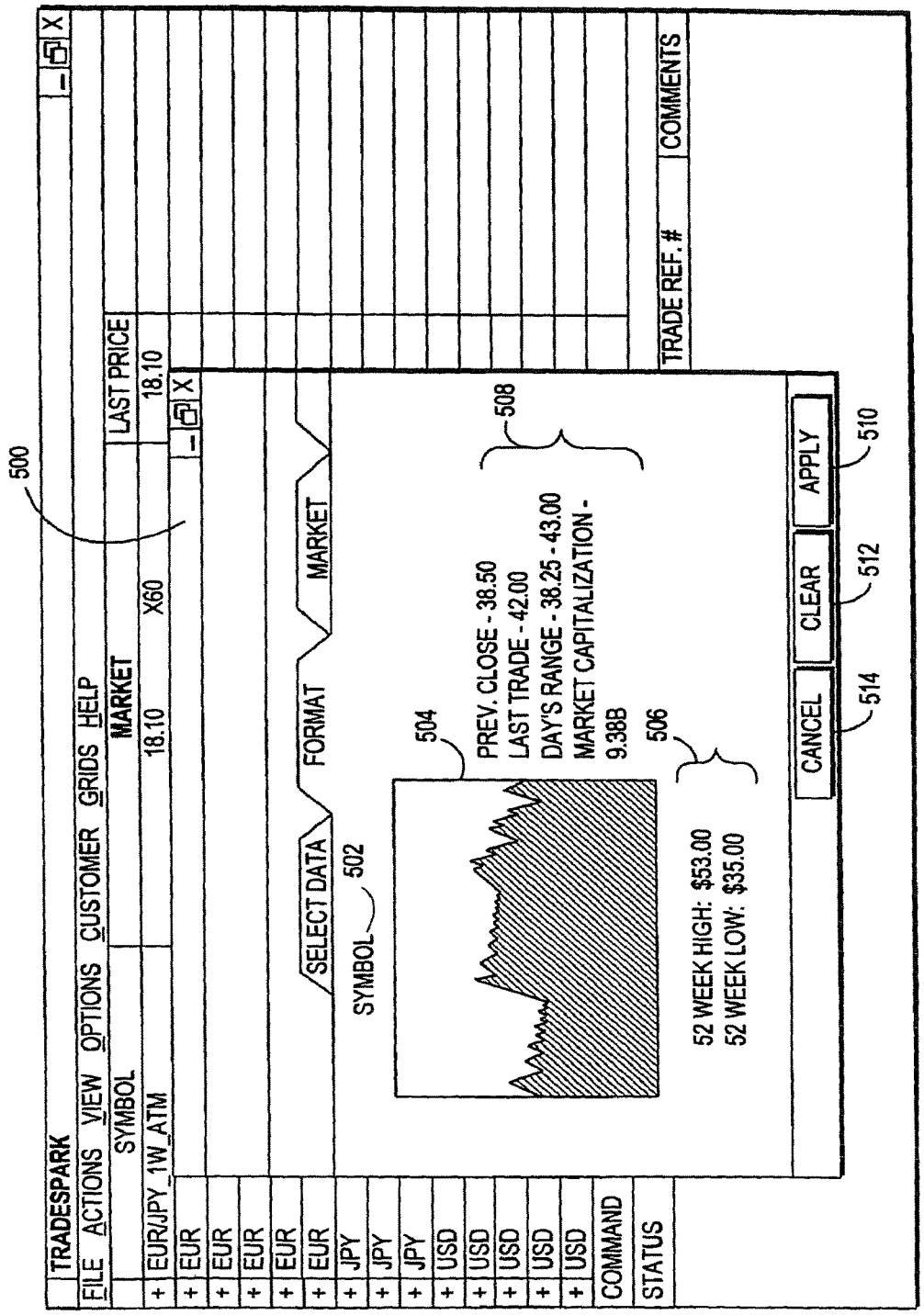
FIG. 8 is an illustrative financial instrument inspector display with a separate window where a user may configure the presentation format of the selected financial performance data in accordance with various embodiments of the present invention.
Figure 9:
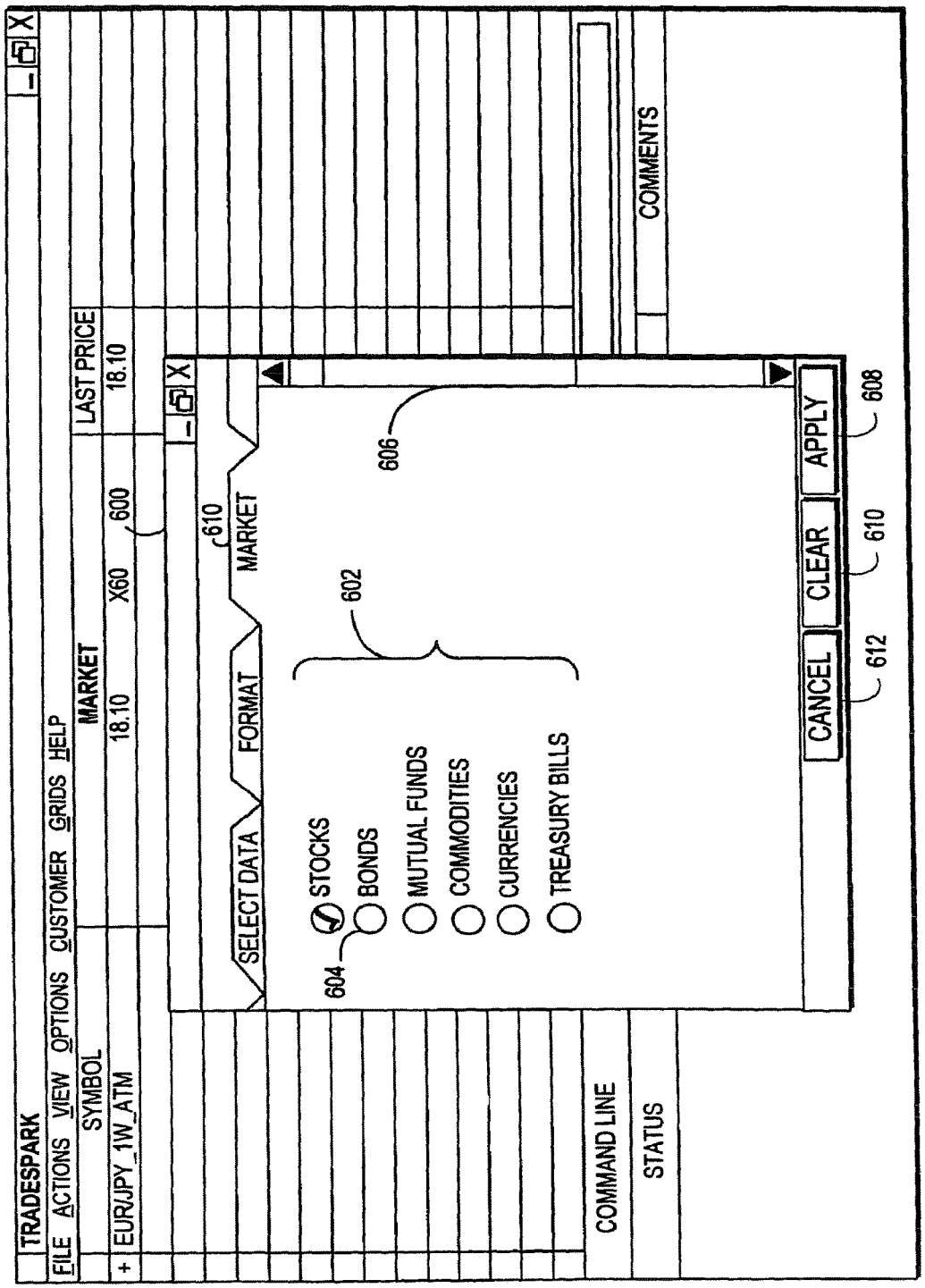
FIG. 9 is an illustrative financial instrument inspector display with a separate window where a user may link a selected presentation format and financial performance information with a particular market segment in accordance with certain embodiments of the present invention.

Market performance data column 110 may be a column of information contained in financial instrument listings window 106. Market performance data column 110 may be a list of market performance information corresponding to the financial instrument symbol listed in adjacent symbol column 108. For example, financial instrument performance data 116 may indicate the financial performance of a financial instrument listed in the adjacent symbol column 108. As shown in FIGS. 7-9 and described below, the type of financial performance data displayed, the display format, and spatial location within financial instrument inspector application display 100 may be user-configurable.

Last price column 112 may contain a list of prices that may be correlated with the financial instruments listed in symbol column 108. In some embodiments, the information in last price column 112 may be automatically updated on a periodic basis (e.g., every second, minute, hour, or any other suitable time interval) in order to reflect changes in valuation of the financial instruments in the market (e.g., the financial instruments listed or traded on the New York Stock Exchange (NYSE), AMEX, NASDAQ, Chicago Board of Trade, Chicago Options Exchange, Tokyo Stock Exchange, FTSE, Paris Stock Exchange, any combination thereof, or any other suitable exchange). Financial instrument price 118, listed in last price column 112, may be the current price of a financial instrument (e.g., financial instrument 114).

Financial instrument inspector window 120 may include the name of the financial instrument, the financial instrument symbol, the financial performance information for the instrument, any combination thereof, or any other suitable information. In some embodiments, the financial performance information displayed in financial instrument inspector window 120 may relate to the investment instrument (e.g., financial instrument 114) selected in financial instrument listings window 106. The type of financial instrument (e.g., stock, bond, futures, option, etc.), the financial performance information displayed (e.g., return on equity, return on investment, current assets, current liabilities, market capitalization, total assets, working capital, etc.), or format of performance data (i.e., where financial performance data is spatially displayed) may be configured by the user. If the user does not specifically configure the type and format of the performance information to be displayed, predefined default financial performance information, formats, and spatial positioning of the financial performance information may be used. For example, if the financial instrument is a stock and the user has not selected financial performance information, format, or spatial location, financial information such as return on equity, debt/equity ratio, and return on investment information for the stock may be displayed. The predetermined default financial performance information displayed may depend upon the type of financial instrument (e.g., stocks, bonds, futures, etc.) or the market in which the financial instrument may be traded (e.g., stock exchange, commodity market, currency market, bond market, etc.).

Financial instrument inspector window 120 may also include command line 122, financial performance data 124, buy button 126, sell button 128, financial instrument calculator 130, any combination thereof, or any other suitable items.

Command line 122 may accept commands from the user. For example, the user may enter commands at command line 122 using user input device 122 of FIG. 2. From command line 122, the user may trade financial instruments, request a comparison of different financial instruments, change the display format of financial performance data, or perform any other suitable action.

Financial performance data 124 may include depth of market, price levels, deposit rates, spot rates, cut-off, Federal wire information, total assets, long-term notes payable, shareholder equity, capital stock, retained earnings, current ratio, quick ratio, cash ratio, working capital, market capitalization, outstanding shares, debt/equity ratio, earnings, revenue, equity, dividend yield, return on equity (ROE), return on investment (ROI), return on capital investment (ROIC), current assets, cash and equivalents, short and long term investments, accounts receivable, inventories and prepaid expenses, current liabilities, accounts payable, accrued expenses, income tax payable, short term notes payable, long term debt payable, book value, enterprise value, price/sales ratio, price/earnings ratio, accounts receivable turnover, days sales outstanding (DSO), inventory turnover, previous close price, last trade price, day's price range, 52 week price range, volume traded, average volume traded, any combination thereof, or any other relevant financial instrument performance information.

Buy button 126, when selected by a user, may execute a buy trade of at least one financial instrument (e.g., financial instrument 114 that may be selected by the user). For example, the user may select a financial instrument from symbol column 108 be purchased, and select button 126 to execute the trade. Buy button 126 may be any suitable selectable item (e.g., selectable by a user with user input device 26 of FIG. 2). Sell button 128, when selected by a user, may execute a sale trade of at least one financial instrument (e.g., financial instrument 114).

Financial instrument calculator 130, when selected by a user, may be used to compare the performance of financial instruments (e.g., stocks, bonds, options, futures, etc.) or may perform any other suitable financial calculation. For example, financial instrument calculator 130 may be a convertible bond calculator. A user may input the valuation date, bond characteristics, market information underlying equity, or any other suitable information. Bond characteristics may include, for example, maturity date, time to maturity, coupon rate, frequency (e.g., annual, semiannual, or any suitable time period), par value, conversion ratio, any combination thereof, or any other suitable information. Market information may include convertible bond price, straight bond yield, risk free rate, any combination thereof, or any other suitable information. Underlying equity may include, for example, underlying share price dividend yield, annualized volatility, any combination thereof, or any other suitable information.

After the user has inputted information into the convertible bond calculator, calculator 130 may output information to display to the user (e.g., on display 24 illustrated in FIG. 2). For example, the outputted information may include accrued interest, market conversion (e.g., conversion price per share, conversion premium or discount, etc.), return characteristics (e.g., yield to maturity, current yield, etc.), convertible bond component value (e.g., straight bond price, straight bond price per share, straight bond premium/discount, embedded option price/share, etc.), theoretical pricing (e.g., option price/share, option value, convertible bond, etc.) downside risk (e.g., to straight bond price, to conversion implied price, maximum downside risk, etc.), any combination thereof, or any other suitable information.

Trade window 132 may include information related to trades of investment instruments. Trade window 132 may include status column 134, type column 136, size column 136, instrument name column 140, price/rate column 142, time column 144, comments column 146, trade reference number column 148, any combination thereof, or any other suitable information.

Status column 134 may list the status of at least one trade of at least one financial instrument. For example, status column may indicate whether the trade has been executed or not, or it may provide any other suitable information. Type column 136 may list the type of trade (e.g., stock, bond, futures, options, etc.) that has been executed or may be executed. Size column 138 may list the number of financial instruments involved in a trade or the total value of the trade. Instrument name column 140 may display the symbol or name for at least one financial instrument that may be involved in a trade transaction. Price/rate column 142 may be the price paid for a trade or for an individual investment instrument. Time 144 may be the time when a trade was executed. Comments column 146 may contain a written description which may characterize the transaction. In some embodiments, a user may enter comments in comments column 146 by using user input device 26 of FIG. 2. Trade reference number column 148 may be a number assigned to the trade to identify the trade for the purposes of recordkeeping. Information such as the status, type, size, price/rate, time, comments, any combination thereof, or any other suitable information may be stored or retrieved by system 10 of FIG. 1.

A user may select a financial instrument, such as financial instrument 114, from list of financial instruments included in symbol column 108. Financial instrument inspector window 120 may display the symbol of the selected financial instrument and its financial performance information. Financial instrument inspector window 120 may also show user-configured financial performance information 124 that may be used to render investment decisions by a user. The presentation of user-configured financial performance information may prevent a user from having to spend time searching for preferred performance information from a variety of sources.

Command line 122, buy button 126, sell button 128, options calculator 130 or other suitable items may be used to trade investment instruments. Details of a trade may be listed in trade window 132. The status, type, size, price, time, trade reference number, comments or other suitable information may be listed in trade window 132.

FIG. 5 is an illustration of a financial instrument inspector application display 200 in which detached trading view window 202 may contain financial performance information of a selected financial instrument. The features of financial instrument inspector application display 200 are similar to financial instrument inspector application display 100 illustrated in FIG. 4 and described above.

Financial instrument inspector window 202 may include the name of the financial instrument, the financial instrument symbol, financial performance data for the instrument, or any other suitable information. The financial performance information contained in window 202 may be similar to that contained in financial instrument inspector window 120 described above and illustrated in FIG. 4.

As illustrated in FIG. 5, trade window 204 of financial instrument inspector application display 200 may contain similar options and functionality to trade window 132 described above and illustrated in FIG. 4. For example, information on the status, type, size, instrument name, price/rate, time, trade reference number, comments, or any other suitable information may be presented.

Trade window 204 may include active orders tab 206, which may be selected by a user to view financial information related to orders for trades of financial instruments. Active orders tab 206 may be any selectable item that may be selected by a user to display information related to orders for trades of financial instruments. Trade history tab 208, when selected by a user, may display a list of trades of financial instruments that have been made by the user. Market history tab 210, when selected by a user, may display a list of historical financial performance information (e.g., 52 week high, 52 week low, 52 week range, trading volume, etc.) for a financial instrument (e.g., stock, bond, futures, options, etc.) in a particular market. For example, selection of market history tab 210 by a user may provide historical financial performance information on IBM stock traded on the New York Stock Exchange. Status tab 212, when selected by a user, may display the status of at least one particular trade. For example, a user may select status tab 212 to view whether a set of requested trades have been executed.

FIG. 6 is an illustrative financial performance application display 300, which may include detached trading view window 302. Detached trading view window 302 is similar to detached trading view window 202 described above and illustrated in FIG. 5. As illustrated in FIGS. 5-6, detached trading view windows (e.g., detached trading view window 202 and 302) may be configured by the user to be in any location in the financial instrument inspector application display (e.g., display 200, display 300, etc.).

FIG. 7 is an illustrative financial instrument inspector application display 400 containing financial performance data configurations window 408 that may allow a user to configure the viewable financial performance information of a financial instrument.

A user may view financial performance data configurations window 408 from financial instrument inspector application display 400. For example, a user may select menu item (e.g., actions, view, options, etc.) from menu options bar 402 in order to view display 408. Alternatively, a user may select a financial instrument (e.g., financial instrument 406) in order to view financial performance data configurations window 408. Financial performance data configurations window 408 may be displayed on financial instrument inspector application display 400, a different display from display 400, or in any suitable location.

Financial performance data configurations window 408 may contain several different selectable tabs or items (e.g., select data tab 410, format tab 412, market tab 414, etc.) which may display information related to the selected tab. For example, if select data tab 410 is selected by the user, financial performance criteria 416 (e.g., return on equity, return on investment, current assets, current liabilities, market capitalization, 52 week high, 52 week low, 52 week performance graph, total assets, working capital, etc.) may be displayed such that a user may select from financial performance criteria 416 in order to configure the financial performance information displayed when a user performs instrument inspection. Financial performance criteria 416 displayed to the user may relate to the type of financial instrument inspection. For example, the financial performance criteria displayed may be different for stocks, bonds, futures, options, or other suitable financial instruments.

Selectable financial performance items 416 may be selected by a user by selecting selection boxes 418. Selection boxes 418 may be checkboxes or any other appropriate selectable items. Multiple selection boxes may be selected by the user in order to have multiple financial performance data items listed during instrument inspection. Scroll bar 420 may be used to scroll through the list of selectable financial performance items. Scroll bar may not be necessary if the amount of information to be displayed fits appropriately in a given area.

Apply button 422 may be selected by a user when the user has completed selecting the financial performance items to be displayed during instrument inspection. Selection of apply button 422 may retain the settings of selected financial performance items in the financial instrument inspection application. Apply button 422 may be a graphical button or any other suitable selectable item.

Clear button 424 may be selected by the user to deselect all financial performance data items that may have been previously selected. Clear button 424 may be a graphical button or any other suitable selectable item.

Cancel button 426 may be selected by the user to exit financial performance data configurations window 408. Selection of cancel button 426 may cause any settings modifications that may have been made prior to selecting cancel button 426 not to be retained by the financial instrument inspector application.

Selection of format tab 412 by the user may display financial performance data configurations window 500 illustrated in FIG. 8. A user may spatially locate financial information in financial performance data configurations window 500. For example, a user input device (e.g., user input device 26 of FIG. 2) may allow a user to move previously-selected financial performance items (e.g., return on equity, return on investment, current assets, current liabilities, market capitalization, total assets, working capital, etc.) into a presentation format. Alternatively, default financial performance items may be located spatially within financial performance data configurations window 500 if financial performance data items have not previously been selected.

Financial instrument market symbol 502 may be the symbol associated with the financial instrument to be inspected. In the format configuration financial performance data configurations window 500, financial instrument market symbol 502 may be a generic symbol that may be freely moved so that the user may define the location of financial instrument market symbol 502.

Performance graph 504 may be a graph, chart or other form of a graphical nature depicting the financial performance of an investment instrument over a particular period of time. The range of time may be selectable by the user. The scale of the axes of the chart or graph may also be configured by the user (e.g., using user input device 26 of FIG. 2). Performance graph 504 may be displayed when format tab 412 (FIG. 7) is selected, depending on whether such a graph was selected by a user from the list of available financial performance information. Performance graph 504 may be freely moved about financial performance data configurations window 500 by a user to a desired location.

Data items 506 may be related to performance graph 504. Data items 506 may be displayed if a user has selected these items from the list of available financial performance information. Alternatively, default financial performance information that may relate to performance graph 504 may be displayed if the user has not previously selected financial performance information (e.g., selecting data element 418 of data list 416 in FIG. 7). Data items 506 may be spatially moved about window 500 by a user to a desired location.

Selected financial performance data 506 may be displayed in the window only if the items have been selected by the user from the list of financial performance items. The location of the financial performance data may be moved throughout the window. Items may be moved individually or in selectable groups.

Apply button 510 may be selected by a user when the user has completed arranging the location of financial performance data items to be displayed during instrument inspection. After selecting the arrangement of information for financial instruments, selection of apply button 510 may retain the positions such that when a user selects an instrument for inspection, the desired information may be presented in the selected format. Selecting clear button 512 may return the financial performance data items to a predetermined default location in financial performance data configurations window 500. Cancel button 514 may be selected by the user to exit a configuration session. Cancel button may be a graphical button or any other suitably selectable item. Selection of cancel button 514 may cause any settings modifications related to selection of financial performance that may have been made prior to selecting the cancel button not to be retained.

Turning again to FIG. 7, when market tab 410 is selected by the user, financial performance data configurations window 600 of FIG. 9 may be displayed. Financial performance data configurations window 600 may include a list of markets to select from such that a set of financial performance data and a presentation format for the performance data may be associated with a particular market.

Selectable market categories 602 may be selected by a user to associate preferences of financial performance data and the presentation formation of the data with a particular market (e.g., stock market, bond market, futures market, etc.). Thus, when a user selects an investment instrument for inspection, the financial performance data and the manner in which the information is displayed may differ amongst financial instruments, depending upon the market (e.g., stock market, bond market, futures market, etc.) for the financial instrument. More than one market may be selected by a user to be affiliated with the selected financial performance information and the presentation format.

Selectable buttons 604 may be radio buttons, check boxes, or any other suitable selectable graphical items.

Scroll bar 606 may be used to scroll through the list of selectable market categories (e.g. selectable market categories 602). Scroll bar may not be necessary if the amount of information to be displayed fits appropriately in a given area.

Apply button 608 may be selected by a user when the user has completed selecting the financial performance data items to be displayed during instrument inspection. Selection of apply button 608 may retain the setting of selected items. Apply button may be any suitable selectable item.

Clear button 610 may be selected by the user to deselect all financial performance data items that had been previously selected. Clear button 610 may be any suitable selectable item.

Cancel button 612 may be selected by the user to exit a configuration session. Selection of cancel button 612 may cause any settings modifications related to selection of financial performance that may have been made prior to selecting the cancel button not to be retained. Cancel button 612 may be any suitable selectable item.

The user may elect to configure the type and format of the financial performance information displayed during instrument inspection. Investment instruments which are traded in different markets may be configured to display particular performance information in a specific presentation display. The selection of the market may precede the selection of financial performance data and its arrangement. The initial selection of the market may alter the number of selectable performance data items. The user may select clear button 610 to deselect all of items in markets list 602. When a user has finished selecting the markets, the user may select apply button 608 to complete the selection process. Selection of cancel button 612 may discontinue the configuration process.

Accordingly, systems and methods for a financial instrument inspector are provided. It will be understood that the foregoing is merely illustrative of the principles of the invention and the various modifications can be made by those skilled in the art without departing from the scope and spirit of the invention, which is limited only by the claims that follow.

What is claimed is:

1. A method comprising:
generating an electronic signal for causing to be displayed at a graphical user interface of an electronic display device, by at least one processor of at least one computer in electronic communication with at least one other computer via an electronic communications network, a plurality of data items in a spatial arrangement at the graphical user interface of the electronic display device, wherein at least one of the plurality of data items is displayed as text at the graphical user interface of the electronic display device;
causing to be selected, by the at least one processor, a first subset of the plurality of data items in response to receiving a first user input at the graphical user interface of the electronic display device;
generating an electronic signal for causing to be spatially moved in the graphical user interface of the electronic display device, by the at least one processor, the selected first subset of the plurality of data items to an altered spatial position at the graphical user interface of the electronic display device relative to a second subset of the plurality of data items in response to receiving a second user input at the graphical user interface of the electronic display device;
saving in an electronic database, by the at least one processor, the altered spatial position of the first subset to be displayed at the graphical user interface of the electronic display device;
receiving, by the at least one processor, electronic data representing a user selection, of a financial instrument, at the graphical user interface of the electronic display device,
wherein the user selection comprises selecting a symbol corresponding to the financial instrument from a list of symbols displayed by the electronic display device in a column at the graphical user interface of the electronic display device, and
wherein the user selection occurs in a financial instrument listings window of the graphical user interface of the electronic display device;
generating an electronic signal for causing to be displayed at the graphical user of the electronic display device, by the at least one processor, the first subset of the plurality of data items and the second subset of the plurality of data items in response to receiving the user selection,
wherein the first subset is displayed in the altered spatial position retrieved from the electronic database and at least one data item of the first subset and the second subset is displayed as text at the graphical user interface of the electronic display device, and
wherein the first and second subsets are caused to be displayed in a data window at the graphical user interface of the electronic display device that is displayed concurrently with the financial instrument listings window at the graphical user interface of the electronic display device; and generating an electronic signal for causing to be displayed at the graphical user interface of the electronic display device, by the at least one processor, data values of the plurality of data items in response to receiving the user selection, wherein the data values indicate performance of the selected financial instrument and at least one of the data values is displayed as a number at the graphical user interface of the electronic display device.

2. A method comprising:
generating an electronic signal for causing to be displayed at a graphical user interface of an electronic display device, by at least one processor of at least one computer in electronic communication with at least one other computer via an electronic communications network, a plurality of data items in a spatial arrangement at the graphical user interface of the electronic display device;
generating an electronic signal for causing altering, at the graphical user interface of the electronic display device, a spatial position of a first subset of the plurality of data items relative to a spatial position of a second subset of the plurality of data items in response to receiving a first user input;
saving in an electronic database, by the at least one processor, the altered spatial position of the first subset to be displayed at the graphical user interface of the electronic display device;
receiving, by the at least one processor, electronic data representing a user selection, of a financial instrument, at the graphical user interface of the electronic display device, wherein the user selection of the financial instrument occurs in a financial instrument listings window at the graphical user interface of the electronic display device;
generating an electronic signal for causing to be displayed at the graphical user interface of the electronic display device of the electronic display device, by the at least one processor, the first subset of the plurality of data items and the second subset of the plurality of data items in response to receiving the user selection,
  wherein the first subset is displayed in the altered spatial position at the graphical user interface of the electronic display device, and
  wherein the first and second subsets are caused to be displayed in a data window that is displayed at the graphical user interface of the electronic display device concurrently with the financial instrument listings window at the graphical user interface of the electronic display device; and
generating an electronic signal for causing to be displayed at the graphical user interface of the electronic display device, by the at least one processor, data values of the plurality of data items in response to receiving the user selection at the graphical user interface of the electronic display device, wherein the data values indicate performance of the selected financial instrument.

3. The method of claim 2 further comprising:
causing to be displayed, by the at least one processor, a graph in response to receiving the user selection of the financial instrument; and
causing to be displayed, by the at least one processor, graphics in the graph in response to receiving the user selection, wherein the graphics indicate performance of the selected financial instrument over a period of time.

4. The method of claim 3 further comprising:
causing to be displayed, by the at least one processor, the graph;
  altering the spatial position of the graph relative to the spatial positions of the plurality of data items in response to receiving a second user input; and
  saving the altered spatial position of the graph, wherein:
  the graph is displayed in the saved altered spatial position in response to receiving the user selection.

5. The method of claim 2 further comprising receiving a user selection of the plurality of data items prior to displaying the plurality of data items in the spatial arrangement, wherein the user selection comprises selecting a symbol corresponding to the financial instrument from a list of symbols displayed in a column.

6. The method of claim 2 further comprising:
receiving a user selection of at least one market, wherein:
  the first subset of the plurality of data items is only displayed in the saved altered spatial position when the selected financial instrument belongs to the at least one selected market.

7. The method of claim 2 wherein the financial instrument listings window comprises:
  a first column listing a plurality of symbols representing respective financial instruments; and
  a second column listing a plurality of data values indicating performance of the respective financial instruments.

8. The method of claim 2 further comprising displaying a financial instrument calculator in the data window.

9. The method of claim 2 further comprising receiving a user selection of a market prior to displaying the plurality of data items in the spatial arrangement.

10. The method of claim 9 wherein the plurality of data items is selected by default in response to receiving the user selection of the market.

11. The method of claim 9 wherein the plurality of data items is selected by a user from a list of data items relating to performance of financial instruments in the selected market, further comprising:
  receiving, by the at least one processor, a user selection of a different financial instrument;
  causing to be displayed, by the at least one processor, the first subset of the plurality of data items and the second subset of the plurality of data items in response to receiving the user selection of the different financial instrument, wherein the first subset is displayed in the altered spatial position; and
  causing to be displayed, by the at least one processor, values of the plurality of data items in response to receiving the user selection of the different financial instrument, wherein the data values indicate performance of the selected different financial instrument.

12. The method of claim 11 wherein availability of at least one data item on the list of data items varies with the selected market.

13. An apparatus comprising:
  at least one processor of at least one computer in electronic communication with at least one other computer via an electronic communications network; and
  at least one memory having instructions stored thereon that are configured to, when executed, cause the at least one processor to:
    generate an electronic signal to cause to display at a graphical user interface of an electronic display device a plurality of data items in a spatial arrangement;
    generate an electronic signal to cause to alter, at the graphical user interface displayed in the electronic display device, a spatial position of a first subset of the plurality of data items relative to a spatial position of a second subset of the plurality of data items in response to receiving a first user input;

save in an electronic database the altered spatial position of the first subset to be displayed at the graphical user interface of the electronic display device;

receive electronic data representing a user selection of a financial instrument, at the graphical user interface of the electronic display device wherein the user selection of the financial instrument occurs in a financial instrument listings window at the graphical user interface of the electronic display device;

generate an electronic signal to cause to display at the graphical user interface of the electronic display device the first subset of the plurality of data items and the second subset of the plurality of data items in response to receiving the user selection at the graphical user interface of the electronic display device, wherein the first subset is displayed at the graphical user interface of the electronic display device in the altered spatial position, wherein the first and second subsets are caused to be displayed in a data window that is displayed at the graphical user interface of the electronic display device concurrently with the financial instrument listings window at the graphical user interface of the electronic display device; and generate an electronic signal to cause to display at the graphical user interface of the electronic the display device data values of the plurality of data items in response to receiving the user selection, wherein the data values indicate performance of the selected financial instrument.

14. The apparatus of claim 13 wherein the instructions are further configured to cause the at least one processor to:
   display a graph in response to receiving the user selection of the financial instrument; and
   display graphics in the graph in response to receiving the user selection, wherein the graphics indicate performance of the selected financial instrument over a period of time.

15. The apparatus of claim 14 wherein the instructions are further configured to cause the at least one processor to:
   display the graph;
   alter the spatial position of the graph relative to the spatial positions of the plurality of data items in response to receiving a second user input; and
   save the altered spatial position of the graph, wherein:
   the graph is displayed in the saved altered spatial position in response to receiving the user selection.

16. The apparatus of claim 13 wherein the instructions are further configured to:
   cause the at least one processor to receive a user selection of the plurality of data items prior to displaying the plurality of data items in the spatial arrangement;
   receive a user selection of a different financial instrument;
   display the first subset of the plurality of data items and the second subset of the plurality of data items in response to receiving the user selection of the different financial instrument, wherein the first subset is displayed in the altered spatial position; and
   display values of the plurality of data items in response to receiving the user selection of the different financial instrument, wherein the data values indicate performance of the selected different financial instrument.

17. The apparatus of claim 13 wherein the instructions are further configured to cause the at least one processor to:
   receive a user selection of at least one market,
   wherein the first subset of the plurality of data items is only displayed in the saved altered spatial position when the selected financial instrument belongs to the at least one selected market, and
   wherein the user selection comprises selecting a symbol corresponding to the financial instrument from a list of symbols displayed in a column.

18. The method of claim 1 further comprising:
   causing to be displayed, by the at least one processor, a graph in response to receiving the user selection of the financial instrument; and
   causing to be displayed, by the at least one processor, graphics in the graph in response to receiving the user selection, wherein the graphics indicate performance of the selected financial instrument over a period of time.

* * * * *